2 Sheets—Sheet 1.

S. P. CADY.
Improvement in Baling-Presses.

No. 131,250. Patented Sep. 10, 1872.

Witnesses:
Augustus H. Girard
J. West Wagner

Inventor,
Selem P. Cady
By his Attorneys
Johnson Klaude & Co.

2 Sheets--Sheet 2.

S. P. CADY.
Improvement in Baling-Presses.

No. 131,250. Patented Sep. 10, 1872.

UNITED STATES PATENT OFFICE.

SELEM P. CADY, OF HASTINGS, MICHIGAN.

IMPROVEMENT IN BALING-PRESSES.

Specification forming part of Letters Patent No. 131,250, dated September 10, 1872.

*To all whom it may concern:*

Be it known that I, SELEM P. CADY, of Hastings, in the county of Barry and State of Michigan, have invented certain new and useful Improvements in Cotton and Hay Presses, of which the following is a specification:

This invention relates to cotton and hay presses; and it consists, first, in a device to be used as an auxiliary or secondary power to compress the bale more firmly after the follower is brought home by the drum and pulleys and the first power fully exhausted; secondly, in a swinging or pivoted end door by which, with the assistance of a rope secured to its lower part and laid over the bale, the latter is drawn or dumped out from its place after being tied; and, thirdly, in the general arrangement of the press, box, and frame, by all of which a very strong and powerful press is produced, which is not liable to get out of order, and may be very easily repaired, and the bale tied without opening the press or that part of it within which the compression of the bale is completed.

Figure 1:
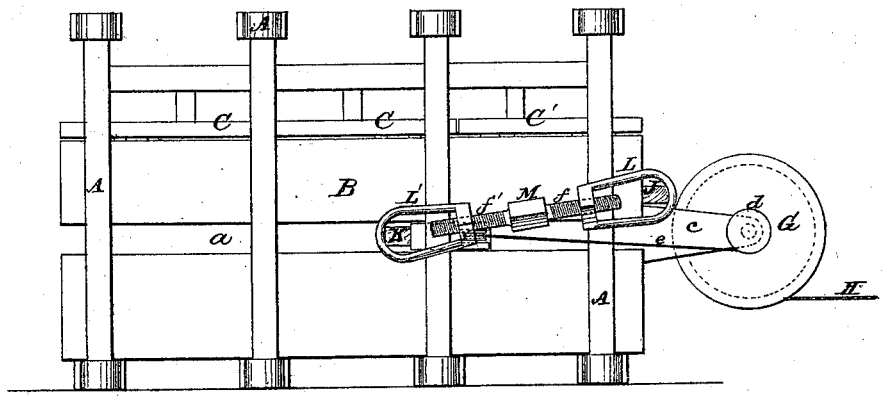
Figure 2:
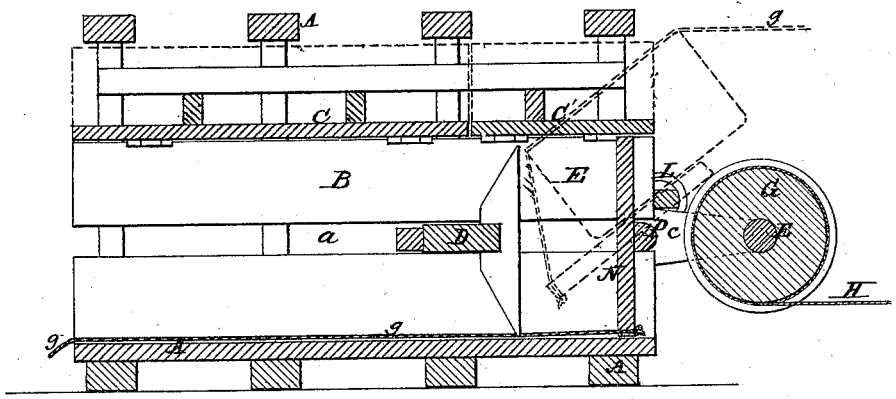
Figure 3:
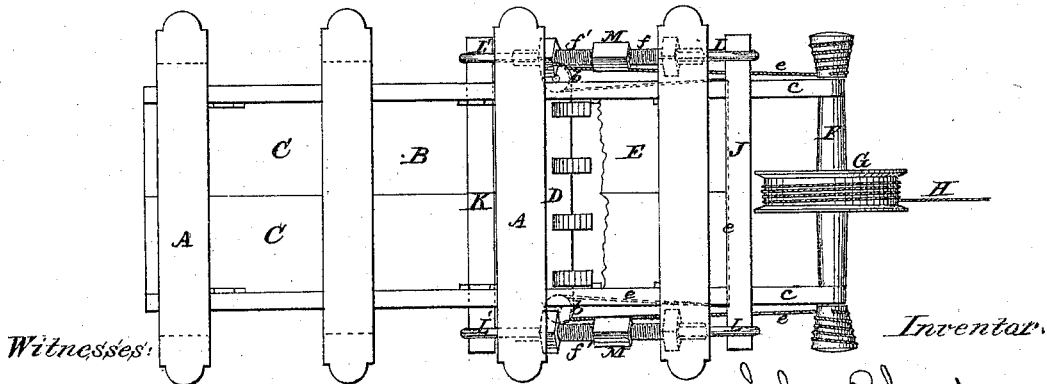
Figure 4:
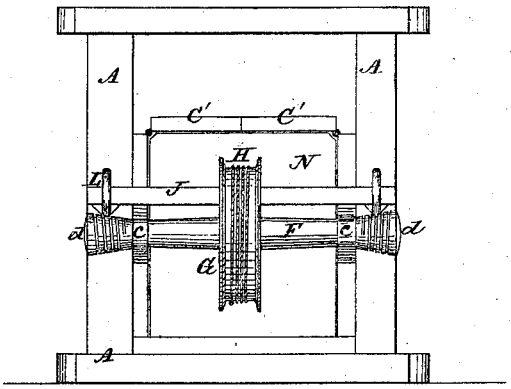
Figure 5:
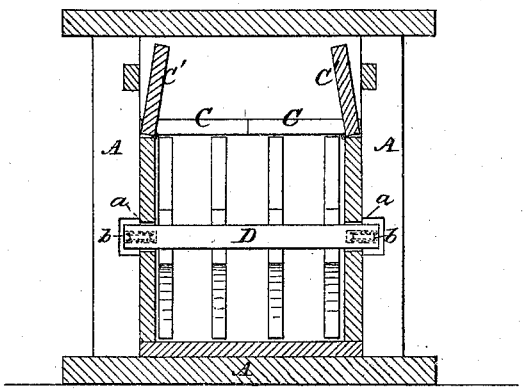
Figure 6:
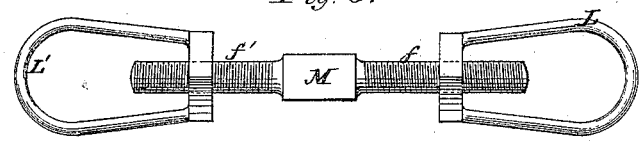
Figure 7:
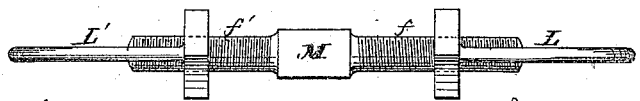

In the accompanying drawing, Figure 1 is a side elevation of a press embracing my improvements. Fig. 2 is a longitudinal section of the same. Fig. 3 is a plan view thereof. Fig. 4 is a front-end view. Fig. 5 is a cross-section. Figs. 6 and 7 are detail views of the secondary or auxiliary compressing device.

In the drawing, A represents a strong framework, to which the receiving-box B is secured, into which the cotton or hay is first loosely placed, and it is provided with doors C C' at the upper side. It has a slot, a, cut out of each side, in which the ends of the follower D slide. This follower is provided at its ends with two small pulleys or sheaves, b b. At the forward end of the receiving-box B is the bale-box E, provided with doors C' at the top, and the usual grooves for the reception of the ropes or bands, by which the bale is secured after being compressed. On the front end of this box are arranged two projecting arms or supports, c c, upon which the shaft F is supported and revolves, and upon this is arranged the drum G and the right-and-left screw-threaded cone-pulleys d d. The motive power is applied to a rope or chain, H, secured to the drum G, and, as this revolves, a chain or rope, e, secured to the large end of the right-and-left grooved cone-pulleys d d, draws the follower D forward, the doors C C' at the top being first closed and secured by bars placed across the top. The chain or rope e that passes over the pulleys passes around the sheaves b in the ends of the follower and around the front end of the frame. It will be very readily understood that the object of the right-and-left grooved cone-pulleys d d is that the follower is moved faster in the beginning when the material is loose, and as it is more tightly compressed the small end moves the follower slower, as more power is needed. After the follower is brought up as far as possible by the drum and pulleys I apply an auxiliary or secondary compressing device, as follows: A strong bar, J, is placed across the front end of the box and another, K, behind the follower D, and over the ends of these bars the threaded shackles L L' are placed, being connected by a bar, M, which has a right-and-left-hand screw, $f f'$, and in the center a square part, over which a forked lever or wrench (not shown in the drawing) is placed, and as this is operated it draws the follower closer and compresses the material about one-seventh of its size more, thus reducing the bulk of the bale, which is a very desirable object, as more bales can be shipped or transported than in the old way. After the bale has been thus compressed it can be very readily removed by a swinging door, N, that is pivoted in the frame-work A at the front end of the box E, a strong rope or ropes, g, being secured to the bottom of the door so as to lie upon the bottom of the box, and when the bale is pressed and tied the doors C' are opened and the rope g thrown over the bale and out at the front end, and by pulling it forward draws upon the lower part of the door N and turns it upon its pivot P so as to open it, and, by continuing the pull upon the rope, lifts the bale out of the chamber E and throws it over the door and drum G upon the ground, as shown by dotted lines in Fig. 2. The doors C C' are made in two sections, the front section, C', covering the bale-box E proper and the sections C the box B. This arrangement allows the doors C to be opened after the bale is pressed, to enable the attendant to enter the box B and tie the bale while it remains within the press intact and closed on all sides, the doors C' not being opened until the bale is ready to be dumped out by the dumping-cord, which may be attached by hook to the singletree of the horse which works the pulley-drum. This arrangement of the door is of great advantage, as by it the tying of the bale is effected before the doors C' of the bale-box are opened. I have described the shackles as secured to bars J and K, but they may be secured to the front posts A of the frame and hooked over the projecting ends of the follower.

Having described my invention, I claim—

1. The bale-box, herein described, provided with the two sets of doors, C C', at the top, as and for the purpose set forth.

2. An auxiliary or secondary compressing device in combination with the follower and press-box, arranged as and for the purpose set forth.

3. The hinged or pivoted door N in combination with the doors C' and the pulling-rope $g$, arranged and operating to dump the bale out at the end of the box, essentially as described.

4. The combination and arrangement of the press-box B E with doors C C' and N, the follower D, sheaves $b\ b$, cone-pulleys $d\ d$, drum G, shaft F, and compressing device, all as shown, and for the purpose set forth.

In testimony whereof I have hereunto set my hand this 12th day of July, A. D. 1872, in the presence of two subscribing witnesses.

SELEM P. CADY.

Witnesses:
 EDM. F. BROWN,
 A. E. H. JOHNSON.